(12) United States Patent
Uozumi et al.

(10) Patent No.: US 9,353,795 B2
(45) Date of Patent: May 31, 2016

(54) ROLLING BEARING

(71) Applicants: Tomohisa Uozumi, Shizuoka (JP);
Tomoyoshi Izutsu, Shizuoka (JP)

(72) Inventors: Tomohisa Uozumi, Shizuoka (JP);
Tomoyoshi Izutsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/389,467

(22) PCT Filed: Apr. 11, 2013

(86) PCT No.: PCT/JP2013/060972
§ 371 (c)(1),
(2) Date: Sep. 30, 2014

(87) PCT Pub. No.: WO2013/157485
PCT Pub. Date: Oct. 24, 2013

(65) Prior Publication Data
US 2015/0093060 A1   Apr. 2, 2015

(30) Foreign Application Priority Data

Apr. 16, 2012   (JP) ................................. 2012-092926

(51) Int. Cl.
*F16C 33/38*   (2006.01)
*F16C 33/66*   (2006.01)
(Continued)

(52) U.S. Cl.
CPC ......... *F16C 33/6681* (2013.01); *F16C 33/3875* (2013.01); *F16C 33/4605* (2013.01);
(Continued)

(58) Field of Classification Search
CPC .. F16C 33/3806; F16C 33/3875; F16C 33/44; F16C 33/4605; F16C 33/6651; F16C 33/6681; F16C 33/4652; F16C 33/52; F16C 2208/52; F16C 2208/60; F16C 2208/62
USPC .................................. 384/470, 527, 528, 530
See application file for complete search history.

(56) References Cited

U.S. PATENT DOCUMENTS 3,975,066 A    8/1976  Hofmann et al.
4,907,898 A *  3/1990  Dickinson ............... F16C 19/26
                                                384/564

(Continued)

FOREIGN PATENT DOCUMENTS

CN    101055003    10/2007
CN    101410642     4/2009
(Continued)

OTHER PUBLICATIONS

International Search Report issued Jul. 2, 2013 in International (PCT) Application No. PCT/JP2013/060972.
(Continued)

*Primary Examiner* — Phillip A Johnson
(74) *Attorney, Agent, or Firm* — Wenderoth, Lind & Ponack, L.L.P.

(57) ABSTRACT

A rolling bearing includes inner and outer races rotatable relative to each other, a plurality of rolling elements interposed between the inner and outer races, and a retainer arranged between the inner and outer races for retaining the plurality of rolling elements equiangularly. Flange portions are formed on a radially inner side and a radially outer side of an axial end portion of the retainer so as to extend radially. Recessed grooves are formed in a region of the inner race and a region of the outer race corresponding to the respective flange portions so as to form labyrinths together with the flange portions. Inner side surfaces of the flange portions and axial end surfaces of the recessed grooves, which are opposed to the inner side surfaces of the flange portions, are inclined radially so as to generate a flow of lubricant.

17 Claims, 6 Drawing Sheets

(51) Int. Cl.
*F16C 33/80* (2006.01)
*F16C 33/78* (2006.01)
*F16C 33/58* (2006.01)
*F16C 33/46* (2006.01)
*F16C 19/06* (2006.01)

(52) U.S. Cl.
CPC ........... *F16C33/4652* (2013.01); *F16C 33/583* (2013.01); *F16C 33/7893* (2013.01); *F16C 33/80* (2013.01); *F16C 19/06* (2013.01); *F16C 2208/62* (2013.01)

(56) References Cited

U.S. PATENT DOCUMENTS

| | | | |
|---|---|---|---|
| 5,069,560 | A | 12/1991 | Niedermeier et al. |
| 2007/0242912 | A1 | 10/2007 | Tanaka et al. |
| 2009/0169144 | A1 | 7/2009 | Akamatsu |
| 2012/0008891 | A1* | 1/2012 | Mitchell ............... F16C 19/163 384/523 |
| 2013/0156360 | A1 | 6/2013 | Uozumi |

FOREIGN PATENT DOCUMENTS

| | | |
|---|---|---|
| DE | 23 29 911 | 1/1975 |
| JP | 55-10140 | 1/1980 |
| JP | 5-58956 | 8/1993 |
| JP | 2002-266876 | 9/2002 |
| JP | 2007-40383 | 2/2007 |
| JP | 2011-80506 | 4/2011 |
| JP | 2012-67826 | 4/2012 |
| JP | 2012067826 A * | 4/2012 |
| WO | 2009/131139 | 10/2009 |

OTHER PUBLICATIONS

International Preliminary Report on Patentability and Written Opinion of the International Searching Authority issued Oct. 21, 2014 in International (PCT) Application No. PCT/JP2013/060972.
Office Action issued Feb. 26, 2016 in counterpart Chinese Application No. 201380019945.1 (with English translation).
Extended European Search Report issued Feb. 29, 2016 in counterpart European Application No. 13777961.7.

* cited by examiner

ROLLING BEARING

TECHNICAL FIELD

The present invention relates to a rolling bearing in which a synthetic resin retainer for retaining rolling elements in a freely rollable manner is interposed between an inner race and an outer race.

BACKGROUND ART

For example, in a gear support shaft of a transmission of a vehicle including an engine, various types of rolling bearings, such as a deep groove ball bearing and an angular contact ball bearing, are widely used.

A rolling bearing of this type mainly includes an inner race having a radially outer surface in which an inner raceway surface is formed, an outer race being arranged on an outer side of the inner race, and having a radially inner surface in which an outer raceway surface is formed, a plurality of rolling elements interposed between the inner raceway surface of the inner race and the outer raceway surface of the outer race in a freely rollable manner, and a retainer arranged between the inner race and the outer race, for retaining the rolling elements equiangularly. Anyone of the inner race and the outer race is mounted to a stationary part such as a housing, and another one of the inner race and the outer race is mounted to a rotary part such as a rotation shaft.

For use of the rolling bearing of this type, there have been proposed rolling bearings of various types, such as a rolling bearing including means for accelerating an inflow of lubricant into an inside of the bearing (for example, see Patent Literature 1), and a rolling bearing including means for restricting the inflow of the lubricant into the inside of the bearing (for example, see Patent Literature 2).

The rolling bearing disclosed in Patent Literature 1 has the following structure. Specifically, races formed of an outer race and an inner race are arranged coaxially, and a plurality of rolling elements are inserted between the races. An annular sealing member is arranged so as to seal an internal space defined by the outer race, the inner race, and the rolling elements, and the sealing member includes an introducing portion having a hole formed therein so as to communicate an outside of the bearing and the inside of the bearing.

In this rolling bearing, using rotation of the sealing member along with rotation of the inner race and the outer race, the lubricant that is present outside the bearing is drawn into the inside of the bearing through the hole of the introducing portion of the sealing member. With this configuration, without separately providing a special lubricating device for pumping the lubricant or separately forming an oil-feeding hole in a track surface, the lubricant can be introduced into the inside of the bearing. Thus, satisfactory rotation performance is ensured at the time of high-speed rotation.

Further, the rolling bearing disclosed in Patent Literature 2 has the following structure. Specifically, narrow guide gaps are formed between the retainer and the inner race and between the retainer and the outer race, and a lubricant-inflow-side end surface of the retainer is formed into an inclined surface. Further, a radially inner surface of the retainer is formed into an inclined surface.

In this rolling bearing, the narrow guide gaps are formed between the retainer and the inner race and between the retainer and the outer race, and the lubricant-inflow-side end surface of the retainer is formed into the inclined surface, and thus the lubricant is prevented from being excessively drawn into the inside of the bearing. Further, the radially inner surface of the retainer is formed into the inclined surface, and thus the lubricant, which excessively flows into the inside of the bearing, is actively discharged to an outside of the bearing.

CITATION LIST

Patent Literature 1: JP 2002-266876 A
Patent Literature 2: WO 2009/131139 A1

SUMMARY OF INVENTION

Technical Problems

By the way, the rolling bearing disclosed in Patent Literature 1 requires preparation of the sealing member as a separate member, and further requires formation of the hole that communicates the outside of the bearing and the inside of the bearing. Accordingly, cost of processing the sealing member is increased, and man-hours for assembling the sealing member are increased. Further, the lubricant drawn into the inside of the bearing is stirred inside the bearing by the rolling elements and the retainer, and the lubricant, which is drawn into the inside of the bearing as rotation speed of the bearing is increased, is concentrated on a radially outer side of the inside of the bearing by a centrifugal force. Resistance to stirring is generated by the lubricant that is thus drawn into the inside of the bearing excessively, and a radially inner side of the inside of the bearing partially lacks lubrication. In particular, torque (heat generation) of the bearing may be remarkably increased under high-speed rotation.

Further, even in the case of the rolling bearing disclosed in Patent Literature 2 having the structure in which the narrow guide gaps are formed between the retainer and the inner race and between the retainer and the outer race, and in which the lubricant-inflow-side end surface of the retainer is formed into the inclined surface, the rolling bearing includes a straight path into which the lubricating oil flows from the outside of the bearing. Thus, an effect of preventing the lubricant from flowing into the inside of the bearing is limited. Further, in a case of structure in which the radially inner surface of the retainer is formed into the inclined surface in order to actively discharge the lubricant, in a periphery of each pocket portion that does not form a circumferentially-continuous ring, a thickness widely varies in an axial direction, and hence there is a risk in that an influence of uneven deformation of the retainer caused by the centrifugal force under high-speed rotation cannot be ignored.

Therefore, the present invention has been proposed in view of the above-mentioned problems, and has an object to provide a rolling bearing capable of supplying, with simple structure, a proper amount of lubricant from an outside of the bearing into an inside of the bearing and discharging the lubricant having a high temperature from the inside of the bearing to the outside of the bearing.

Solution to Problems

As technical measures for achieving the above-mentioned object, according to one embodiment of the present invention, there is provided a rolling bearing, comprising: an inner race and an outer race rotatable relative to each other; a plurality of rolling elements interposed between the inner race and the outer race; a retainer arranged between the inner race and the outer race, for retaining the plurality of rolling elements equi-angularly; a flange portion formed on at least one of a radially inner side and a radially outer side of an axial end portion of the retainer so as to extend radially; and a recessed groove formed in a region of the inner race corresponding to the flange portion or a region of the outer race corresponding to the flange portion so as to form a labyrinth together with the flange portion, wherein at least one of an inner side surface of the flange portion and an axial end surface of the recessed groove, which is opposed to the inner side surface of the flange portion, is inclined radially so as to generate a flow of lubricant. That is, the present invention has been made focusing on a flow of lubricating oil and labyrinth structure formed by the flange portion and the recessed groove, and can intentionally generate the flow of the lubricating oil through appropriate combinations of the structure formed by the flange portion and the recessed groove without separately preparing the sealing member including the introducing portion having the hole formed therein so as to communicate the outside of the bearing and the inside of the bearing.

Note that, the description: "at least one of the radially inner side and the radially outer side" encompasses all of the following cases: a case where the flange portion is formed on only the radially inner side; a case where the flange portion is formed on only the radially outer side; and a case where the flange portion is formed on both of the radially inner side and the radially outer side. Further, the description: "at least one of the inner side surface of the flange portion and the axial end surface of the recessed groove, which is opposed to the inner side surface of the flange portion," encompasses all of the following cases: a case where only the inner side surface of the flange portion is inclined; a case where only the axial end surface of the recessed groove, which is opposed to the inner side surface of the flange portion, is inclined; and a case where both of the inner side surface of the flange portion and the axial end surface of the recessed groove, which is opposed to the inner side surface of the flange portion, are inclined.

According to one embodiment of the present invention, the flange portion extending radially is formed on at least one of the radially inner side and the radially outer side of the axial end portion of the retainer. Further, in the region of the inner race or the region of the outer race corresponding to the flange portion, the recessed groove is formed so as to define the labyrinth together with the flange portion. At least one of the inner side surface of the flange portion and the axial end surface of the recessed groove, which is opposed to the inner side surface of the flange portion, is inclined radially, and thus the labyrinth defined by the flange portion and the recessed groove controls the flow of the lubricant by an inclined surface formed of the inner side surface of the flange portion or the axial end surface of the recessed groove. With this simple structure, a proper amount of the lubricant can be supplied from the outside of the bearing into the inside of the bearing, and the lubricant having a high temperature can be discharged from the inside of the bearing to the outside of the bearing. As a result, it is possible to prevent foreign matters or an excessive amount of the lubricant from flowing from the outside of the bearing into the inside of the bearing, and to promptly discharge foreign matters contained in the lubricant having a high temperature.

According to one embodiment of the present invention, when supplying the proper amount of the lubricant from the outside of the bearing into the inside of the bearing and discharging the lubricant having a high temperature from the inside of the bearing to the outside of the bearing, it is desired that, through the labyrinth formed by the flange portion and the recessed groove, the lubricant flowing from the outside of the bearing into the inside of the bearing and flowing out of the inside of the bearing to the outside of the bearing flow in such a direction that the lubricant flows into the bearing from the radially inner side of the retainer and flows out of the bearing to the radially outer side of the retainer.

According to one embodiment of the present invention, in a case where the lubricant flows in such a direction that the lubricant flows into the bearing from the radially inner side of the retainer and flows out of the bearing to the radially outer side of the retainer, the following structure is desired. Specifically, the inner side surface of the flange portion positioned on the radially inner side of each axial end portion of the retainer is inclined so as to expand the labyrinth radially inward, and the axial end surface of the recessed groove positioned at each axial end portion of the outer race is inclined so as to expand the labyrinth radially inward.

According to one embodiment of the present invention, when supplying the proper amount of the lubricant from the outside of the bearing into the inside of the bearing and discharging the lubricant having a high temperature from the inside of the bearing to the outside of the bearing, it is desired that, through the labyrinth formed by the flange portion and the recessed groove, the lubricant flowing from the outside of the bearing into the inside of the bearing and flowing out of the inside of the bearing to the outside of the bearing flow in such a direction that the lubricant flows into the bearing from one axial end side of the retainer and flows out of the bearing to another axial end side of the retainer.

According to one embodiment of the present invention, in a case where the lubricant flows in such a direction that the lubricant flows into the bearing from one axial end side of the retainer and flows out of the bearing to another axial end side of the retainer, the following structure is desired. Specifically, the inner side surface of the flange portion positioned on the radially inner side of one axial end portion of the retainer is inclined so as to expand the labyrinth radially inward, and the inner side surface of the flange portion positioned on the radially outer side of the one axial end portion of the retainer is inclined so as to expand the labyrinth radially inward. In addition, the inner side surface of the flange portion positioned on the radially outer side of another axial end portion of the retainer is inclined so as to expand the labyrinth radially outward, and the axial end surface of the recessed groove positioned at an axial end portion of the outer race is formed in a direction orthogonal to an axial direction of the rolling bearing.

According to one embodiment of the present invention, it is desired that the flange portion have an axial thickness of 0.15 mm or more, and that the axial thickness be set to 20% or less of a diameter of each of the plurality of rolling elements. Thus, when the axial thickness of the flange portion is limited within the above-mentioned range, strength of the flange portion can be ensured, and forming of the flange portion is facilitated. As a result, an axial dimension of the bearing is not increased. Note that, when the axial thickness of the flange portion is smaller than 0.15 mm, poor strength of the flange portion and poor forming thereof are more likely to be caused. Further, when the axial thickness of the flange portion is larger than 20% of the diameter of each rolling element, axial dimensions of the inner race and the outer race are increased along with increase in axial dimension of the retainer, and hence the bearing is increased in size.

It is desired that the retainer according to one embodiment of the present invention have the following structure. Specifically, the retainer comprises two annular members that face each other in the axial direction and have opposing surfaces each comprising hemispherical pockets formed in a plurality of circumferential positions and configured to receive the plurality of rolling elements. The two annular members are coupled together so that the opposing surfaces are brought into abutment on each other. In a case of adopting this structure, when the centrifugal force is applied under high-speed rotation, the two annular members forming the retainer prevent their own deformation mutually, and thus can prevent deformation of the entire retainer. As a result, it is possible to prevent the rolling elements from falling off from the pockets, and from interfering with other components such as the inner race and the outer race.

In view of achieving light-weighting of the retainer, according to one embodiment of the present invention, it is effective that the retainer be made of a synthetic resin. Further, in consideration of cost and resistance against oil, it is desired that the retainer be made of any one synthetic resin selected from among PPS, PA66, and PA46.

In a case where the retainer according to the present invention has structure in which two annular members having asymmetrical shapes are coupled together, it is desired that the annular members be colored differently. Thus, the annular members can be easily distinguished from each other, and a flow of the lubricating oil can be reliably generated in an intended direction.

Advantageous Effects of Invention

According to one embodiment of the present invention, the flange portion extending radially is formed on at least one of the radially inner side and the radially outer side of the axial end portion of the retainer. Further, in the region of the inner race or the region of the outer race corresponding to the flange portion, the recessed groove is formed so as to define the labyrinth together with the flange portion. Further, at least one of the inner side surface of the flange portion and the axial end surface of the recessed groove, which is opposed to the inner side surface of the flange portion, is inclined radially so as to generate the flow of the lubricant. Thus, cost reduction can be achieved without increasing the number of components and assemblyman-hours. Further, the proper amount of the lubricant can be supplied from the outside of the bearing into the inside of the bearing, and the lubricant having a high temperature can be discharged from the inside of the bearing to the outside of the bearing. Accordingly, it is possible to prevent increase in torque (heat generation) of the bearing under high-speed rotation. In addition, it is possible to prevent foreign matters or an excessive amount of the lubricant from flowing from the outside of the bearing into the inside of the bearing, and to promptly discharge foreign matters contained in the lubricant having a high temperature. Accordingly, the life of the rolling bearing can be prolonged. As a result, it is possible to provide a rolling bearing to be used in an automobile and suitable for a high-speed rotation bearing to be employed in an electric vehicle and a hybrid vehicle.

DESCRIPTION OF EMBODIMENTS

A rolling bearing according to embodiments of the present invention is described in detail below. The rolling bearing according to the embodiments of the present invention is suitable particularly for a high-speed rotation bearing to be used in an automobile and employed under oil bath lubrication in an electric vehicle and a hybrid vehicle. Note that, FIG. 1 illustrates an embodiment of the present invention, and FIG. 2 illustrates another embodiment of the present invention.

Figure 1:
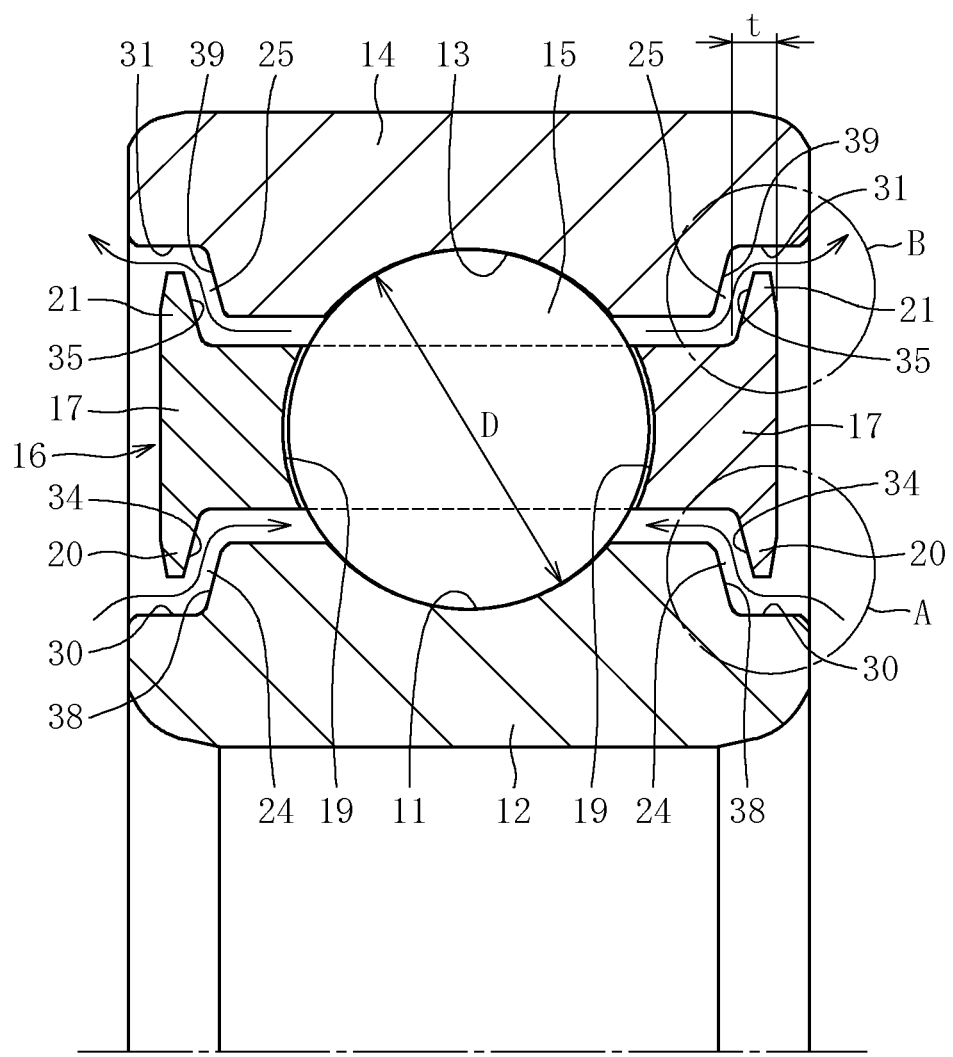
FIG. 1 is a partial cross-sectional view illustrating a rolling bearing according to an embodiment of the present invention.
Figure 2:
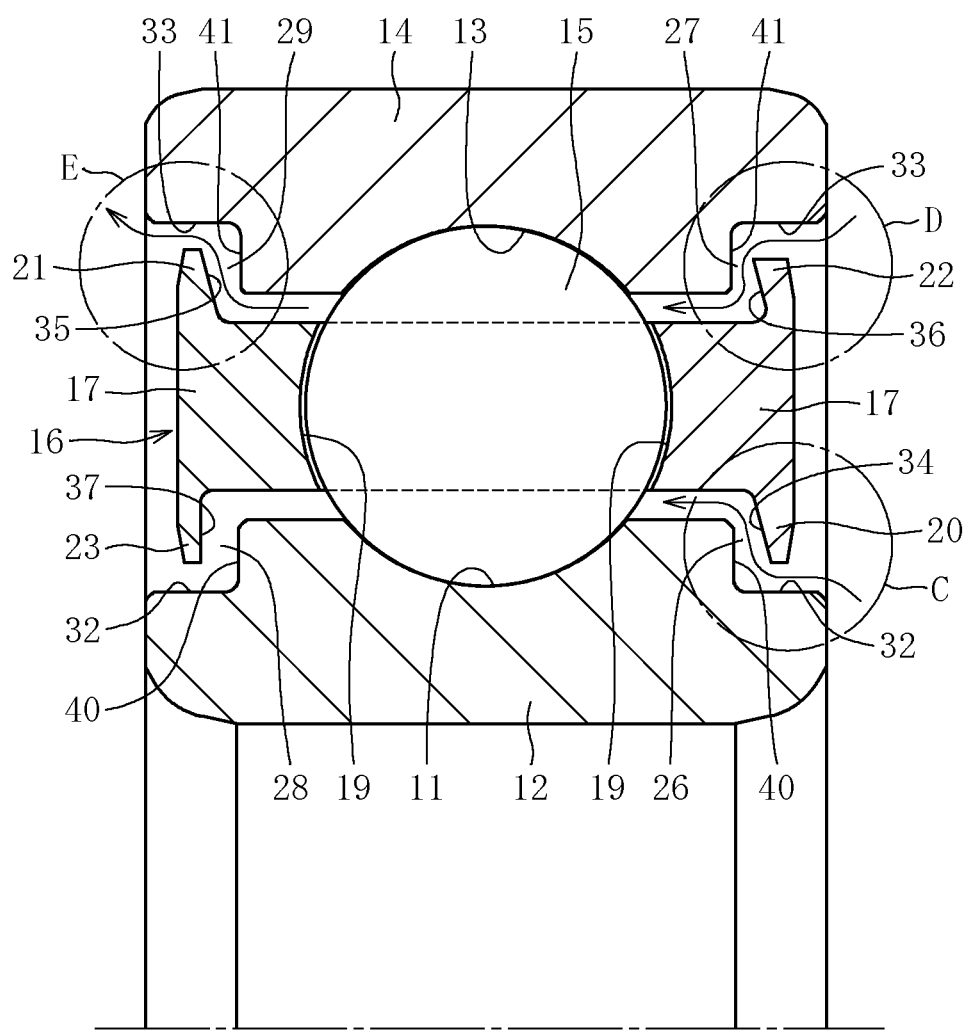
FIG. 2 is a partial cross-sectional view illustrating a rolling bearing according to another embodiment of the present invention.

As illustrated in FIGS. 1 and 2, the rolling bearing according to each embodiment mainly comprises an inner race 12 having a radially outer surface in which an inner raceway surface 11 is formed, an outer race 14 being arranged on an outer side of the inner race 12, and having a radially inner surface in which an outer raceway surface 13 is formed, a plurality of rolling elements 15 interposed between the inner raceway surface 11 of the inner race 12 and the outer raceway surface 13 of the outer race 14 in a freely rollable manner, and a retainer 16 arranged between the inner race 12 and the outer race 14, for retaining the rolling elements 15 equiangularly. Any one of the inner race 12 and the outer race 14 is mounted to a stationary part such as a housing, and another one of the inner race 12 and the outer race 14 is mounted to a rotary part such as a rotation shaft.

The rolling bearing comprises the lightweight and synthetic resin retainer 16, which is designed so as to prevent deformation of the retainer 16 caused by a centrifugal force under high-speed rotation. In consideration of cost and resistance against oil, it is effective that the retainer 16 be made of any one synthetic resin selected from among polyphenylene sulfide (PPS), polyamide 66 (PA66), and polyamide 46 (PA46). Note that, as other resin materials, polyamide 9T (PA9T), polyether ether ketone (PEEK), and a phenol resin may be used.

Figure 3A:
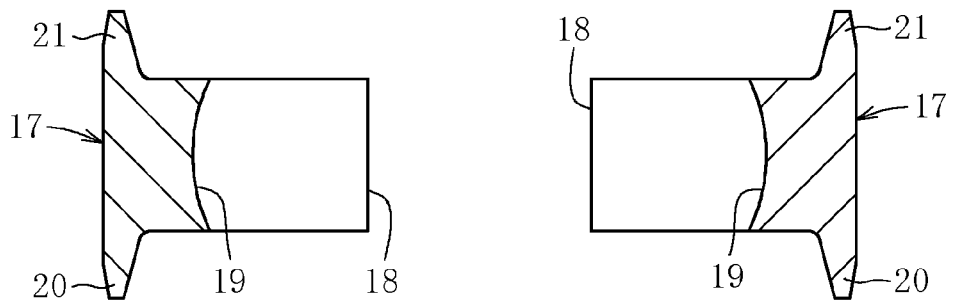
FIG. 3A is a cross-sectional view illustrating two annular members forming the retainer of FIG. 1 before coupling.
Figure 3B:
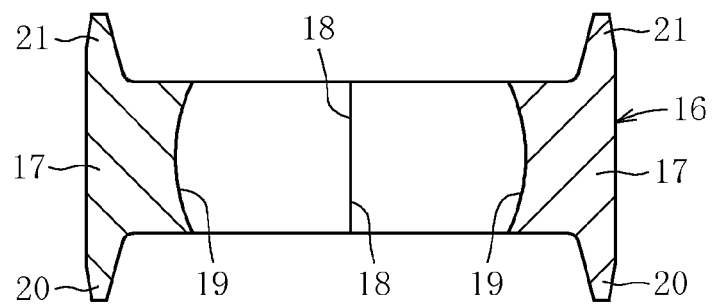
FIG. 3B is a cross-sectional view illustrating the two annular members forming the retainer of FIG. 1 after coupling.
Figure 4A:
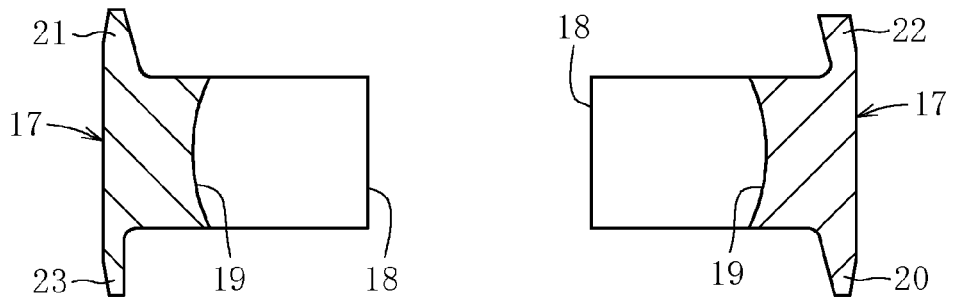
FIG. 4A is a cross-sectional view illustrating two annular members forming the retainer of FIG. 2 before coupling.
Figure 4B:
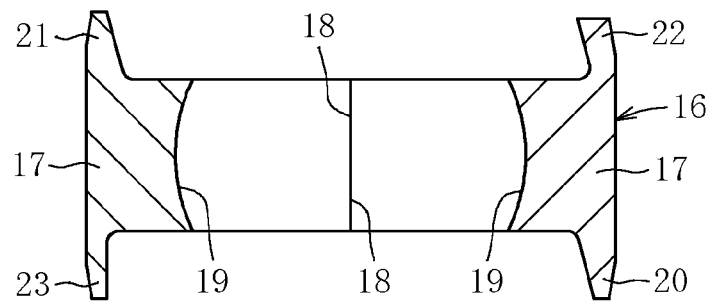
FIG. 4B is a cross-sectional view illustrating the two annular members forming the retainer of FIG. 2 after coupling.

FIGS. 3A and 3B illustrate the retainer 16 of FIG. 1, and FIGS. 4A and 4B illustrate the retainer 16 of FIG. 2. The retainer 16 has the following shape. Specifically, two annular members 17 face each other in an axial direction, and each have an opposing surface 18 comprising hemispherical pockets 19 formed in a plurality of circumferential positions and configured to receive the rolling elements 15 (see FIGS. 1 and 2). The opposing surfaces 18 of the annular members 17 are brought into abutment on each other, and thus the two annular members 17 are coupled together at a coupling portion (not shown). The two annular members 17 prevent their own deformation mutually, and thus can prevent deformation of the entire retainer 16. As a result, it is possible to prevent the rolling elements 15 from falling off from the pockets 19, and from interfering with other components such as the inner race 12 and the outer race 14.

The rolling bearing has such simple structure that, when the rolling bearing is used under oil bath lubrication, a proper amount of lubricant is supplied from an outside of the bearing into an inside of the bearing, and the lubricant having a high temperature is discharged from the inside of the bearing to the outside of the bearing. That is, as illustrated in FIGS. 1 and 2, flange portions 20 to 23 extending radially are formed on both of a radially inner side and a radially outer side of both axial end portions of the retainer 16. Further, in regions of the inner race 12 and regions of the outer race 14 corresponding to the flange portions 20 to 23, recessed grooves 30 to 33 are formed so as to define labyrinths 24 to 29 together with the flange portions 20 to 23. Inner side surfaces 34 to 37 of the flange portions 20 to 23 are inclined radially, or axial end surfaces 38, 40 of the recessed grooves 30, 32 of the inner race and axial end surfaces 39, 41 of the recessed grooves 31, 33 of the outer race, which are opposed to the inner side surfaces 34 to 37 of the flange portions, are inclined radially. In this manner, the axial end surfaces 38, 40 of the inner race and the axial end surfaces 39, 41 of the outer race are inclined as appropriate, or the inner side surfaces 34 to 37 of the flange portions are inclined as appropriate. Thus, a flow of lubricating oil can be generated intentionally.

Note that, the recessed grooves 30, 32 on the inner race side are formed by recessing axial end portions of the radially outer surface of the inner race 12 in a stepped manner, and the recessed grooves 31, 33 on the outer race side are formed by recessing axial end portions of the radially inner surface of the outer race 14 in a stepped manner. Further, the flange portions 20, 23 formed integrally with the annular members 17, the recessed grooves 30, 32 formed integrally with the inner race 12, and the recessed grooves 31, 33 formed integrally with the outer race 14 form the labyrinths 24 to 29, and hence it is only necessary to change shapes of the retainer 16, the inner race 12, and the outer race 14. Accordingly, the number of components and assembly man-hours can be reduced, and thus cost reduction is easily achieved.

In the embodiment illustrated in FIG. 1, as the structure in which the proper amount of the lubricant is supplied from the outside of the bearing into the inside of the bearing, and the lubricant having a high temperature is discharged from the inside of the bearing to the outside of the bearing, there is exemplified a case where, through the labyrinths 24, 25 formed by the flange portions 20, 21 and the recessed grooves 30, 31, the lubricant flowing from the outside of the bearing into the inside of the bearing and flowing out of the inside of the bearing to the outside of the bearing flows in such a direction (radial direction) that the lubricant flows into the bearing from the radially inner side of the retainer 16 and flows out of the bearing to the radially outer side of the retainer 16.

The rolling bearing according to the embodiment, in which the lubricant flows in the radial direction in the above-mentioned manner, has such structure that the inner side surface 34 of the flange portion 20 positioned on the radially inner side of each axial end portion of the retainer 16 is inclined so as to expand the labyrinth radially inward, and that the axial end surface 39 of the recessed groove 31 positioned at each axial end portion of the outer race 14 is inclined so as to expand the labyrinth radially inward. In this case, the inner side surface 34 of the flange portion 20 and the inner side surface 35 of the flange portion 21 positioned at each axial end portion of the retainer 16 are inclined so as to expand the labyrinth radially on an entire periphery of the inner side surface 34 and an entire periphery of the inner side surface 35. The retainer 16 has a symmetrical shape. Accordingly, when a centrifugal force is applied under high-speed rotation, the two annular members 17 forming the retainer 16 prevent their own deformation mutually, and thus can prevent deformation of the entire retainer 16. As a result, it is possible to prevent the rolling elements 15 from falling off from the pockets 19, and from interfering with other components such as the inner race 12 and the outer race 14.

Note that, in this embodiment, the axial end surface 39 of the recessed groove 31 positioned at each axial end portion of the outer race 14 and opposed to the inner side surface 35 of the flange portion is inclined so as to expand the labyrinth radially inward (the axial end surface 39 of the recessed groove 31 is parallel to the inner side surface 35 of the flange portion 21), but the axial end surface 39 may have such a shape as to extend in a direction orthogonal to the axial direction. Further, similarly, the axial end surface 38 of the recessed groove 30 positioned at each axial end portion of the inner race 12 and opposed to the inner side surface 34 of the flange portion is inclined so as to expand the labyrinth radially outward (the axial end surface 38 of the recessed groove 30 is parallel to the inner side surface 34 of the flange portion 20), but the axial end surface 38 may have such a shape as to extend in the direction orthogonal to the axial direction.

When the centrifugal force is applied under high-speed rotation, the lubricant flows as indicated by the arrows of FIG. 1. Specifically, through the labyrinth 24 formed by the recessed groove 30 of the inner race 12 and the flange portion 20 positioned on the radially inner side of the retainer 16, the lubricant is drawn into the bearing due to a pumping function caused by the centrifugal force, and thus flows into the inside of the bearing. Then, the lubricant flows out of the bearing through the labyrinth 25 formed by the recessed groove 31 of the outer race 14 and the flange portion 21 positioned on the radially outer side of the retainer 16.

Figure 5:
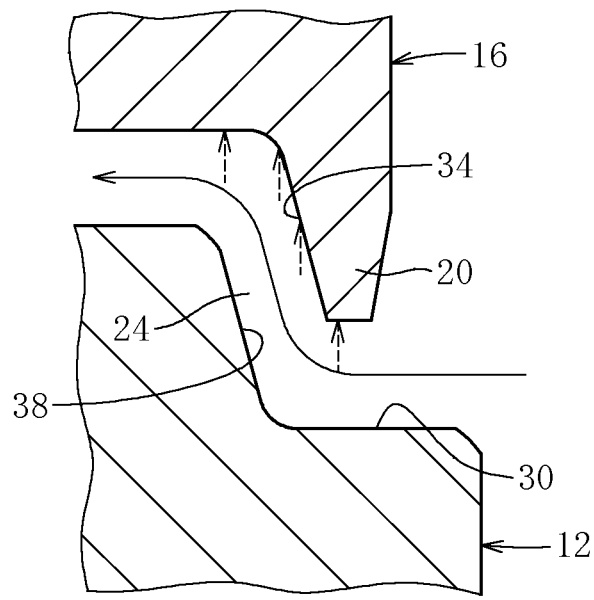
FIG. 5 is an enlarged cross-sectional view of a main part of the rolling bearing indicated by the circle "A" of FIG. 1.

In the labyrinth 24 (see FIG. 1) formed by the recessed groove 30 of the inner race 12 and the flange portion 20 positioned on the radially inner side of the retainer 16, as illustrated in FIG. 5, the lubricant is caused to flow radially outward by the centrifugal force generated under high-speed rotation (see the dashed arrows of FIG. 5). At this time, the inner side surface 34 of the flange portion 20 is inclined so as to expand the labyrinth radially inward, and thus the lubricant flows along the inner side surface 34 of the flange portion 20. As a whole, the lubricant flows as indicated by the solid arrow of FIG. 5.

Figure 6:
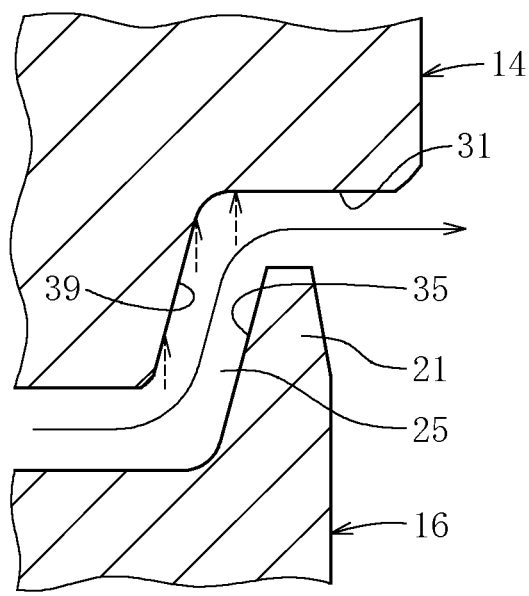
FIG. 6 is an enlarged cross-sectional view of a main part of the rolling bearing indicated by the circle "B" of FIG. 1.

Further, in the labyrinth 25 (see FIG. 1) formed by the recessed groove 31 of the outer race 14 and the flange portion 21 positioned on the radially outer side of the retainer 16, as illustrated in FIG. 6, the lubricant is caused to flow radially outward by the centrifugal force generated under high-speed rotation (see the dashed arrows of FIG. 6). At this time, the axial end surface 39 of the recessed groove 31 of the outer race 14 is inclined so as to expand the labyrinth radially inward, and thus the lubricant flows along the axial end surface 39 of the recessed groove 31. As a whole, the lubricant flows as indicated by the solid arrow of FIG. 6.

In the another embodiment illustrated in FIG. 2, as the structure in which the proper amount of the lubricant is supplied from the outside of the bearing into the inside of the bearing, and the lubricant having a high temperature is discharged from the inside of the bearing to the outside of the bearing, there is exemplified a case where, through the labyrinths 26 to 29 formed by the flange portions 20 to 23 and the recessed grooves 32, 33, the lubricant flowing from the outside of the bearing into the inside of the bearing and flowing out of the inside of the bearing to the outside of the bearing flows in such a direction (axial direction) that the lubricant flows into the bearing from one axial end side of the retainer 16 and flows out of the bearing to another axial end side of the retainer 16. In this case, the lubricant flows from the right side to the left side of FIG. 2. Conversely, in a case where the lubricant is required to flow from the left side to the right side of FIG. 2, the flange portions 20 to 23 of the retainer 16 may be arranged in a laterally inverted state.

The rolling bearing according to the another embodiment, in which the lubricant flows in the axial direction in the above-mentioned manner, has such structure that the inner side surface 34 of the flange portion 20 positioned on the radially inner side of the one axial end portion of the retainer 16 is inclined so as to expand the labyrinth radially inward, and the inner side surface 36 of the flange portion 22 positioned on the radially outer side of the one axial end portion of the retainer 16 is inclined so as to expand the labyrinth radially inward, and that the inner side surface 35 of the flange portion 21 positioned on the radially outer side of the another axial end portion of the retainer 16 is inclined so as to expand the labyrinth radially outward, and the axial end surface 41 of the recessed groove 33 positioned on a radially outer side of an axial end portion of the outer race 14 is formed in a direction orthogonal to the axial direction. In this case, the retainer 16 has structure in which the two annular members 17 having asymmetrical shapes are coupled together. However, the annular members 17 are colored differently, and thus are easily distinguished from each other. Accordingly, it is possible to reliably generate a flow of the lubricating oil in an intended direction. Further, this structure does not reduce workability at the time of manufacture of the retainer 16. Note that, the inner side surface 37 of the flange portion 23 positioned on the radially inner side of the another axial end portion of the retainer 16 is shaped so as to extend in the direction orthogonal to the axial direction.

Note that, in this embodiment, the axial end surface 40 of the recessed groove 32, which is positioned at each axial end portion of the inner race 12 and opposed to each of the inner side surfaces 34, 37 of the flange portions, is shaped so as to extend in the direction orthogonal to the axial direction, but the axial end surface 40 may be shaped to be inclined so as to expand the labyrinth radially outward. Further, similarly, the axial end surface 41 of the recessed groove 33, which is positioned at each axial end portion of the outer race 14 and opposed to each of the inner side surfaces 35, 36 of the flange portions, is shaped so as to extend in the direction orthogonal to the axial direction, but the axial end surface 41 may be shaped to be inclined so as to expand the labyrinth radially inward.

When the centrifugal force is applied under high-speed rotation, the lubricant flows as indicated by the arrows of FIG. 2. Specifically, through the labyrinth 26 formed by the recessed groove 32 of the inner race 12 and the flange portion 20 positioned on the radially inner side of the retainer 16, the lubricant is drawn into the bearing due to the pumping function caused by the centrifugal force, and thus flows into the inside of the bearing. Further, through the labyrinth 27 formed by the recessed groove 33 of the outer race 14 and the flange portion 22 positioned on the radially outer side of the retainer 16, the lubricant is drawn into the bearing due to the pumping function caused by the centrifugal force, and thus flows into the inside of the bearing. Then, the lubricant flows out of the bearing through the labyrinth 29 formed by the recessed groove 33 of the outer race 14 and the flange portion 21 positioned on the radially outer side of the retainer 16.

Figure 7:
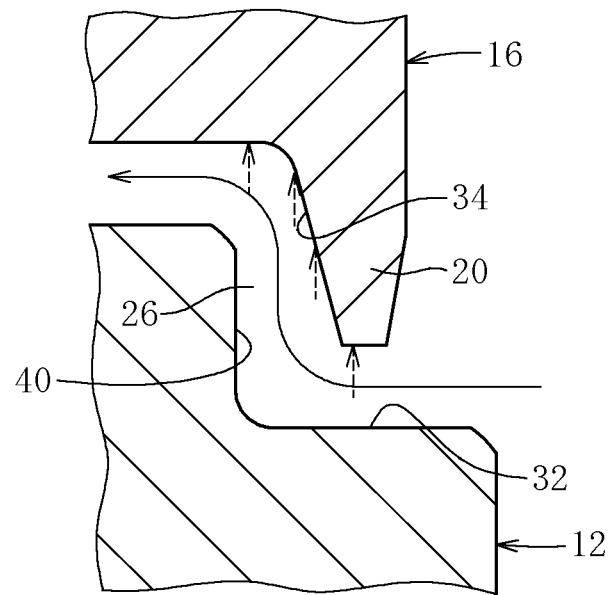
FIG. 7 is an enlarged cross-sectional view of a main part of the rolling bearing indicated by the circle "C" of FIG. 2.

In the labyrinth 26 (see FIG. 2) formed by the recessed groove 32 of the inner race 12 and the flange portion 20 positioned on the radially inner side of the retainer 16, as illustrated in FIG. 7, the lubricant is caused to flow radially outward by the centrifugal force generated under high-speed rotation (see the dashed arrows of FIG. 7). At this time, the inner side surface 34 of the flange portion 20 is inclined so as to expand the labyrinth radially inward, and thus the lubricant flows along the inner side surface 34 of the flange portion 20. As a whole, the lubricant flows as indicated by the solid arrow of FIG. 7.

Figure 8:
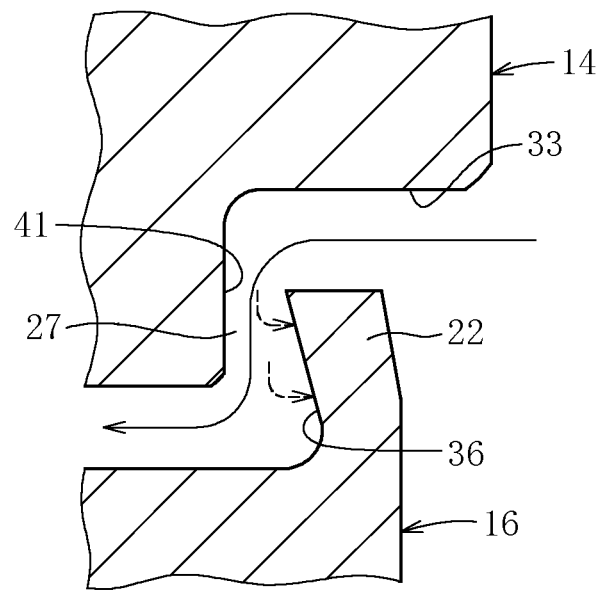
FIG. 8 is an enlarged cross-sectional view of a main part of the rolling bearing indicated by the circle "D" of FIG. 2.

Further, in the labyrinth 27 (see FIG. 2) formed by the recessed groove 33 of the outer race 14 and the flange portion 22 positioned on the radially outer side of the retainer 16, as illustrated in FIG. 8, when the lubricant is caused to flow radially outward by the centrifugal force generated under high-speed rotation, the inner side surface 36 of the flange portion 22 is inclined so as to expand the labyrinth radially inward, and thus the lubricant hits against the inner side surface 36 (see the dashed arrows of FIG. 8). As a result, the lubricant flows axially inward, and the lubricant flows as indicated by the solid arrow of FIG. 8.

Figure 9:
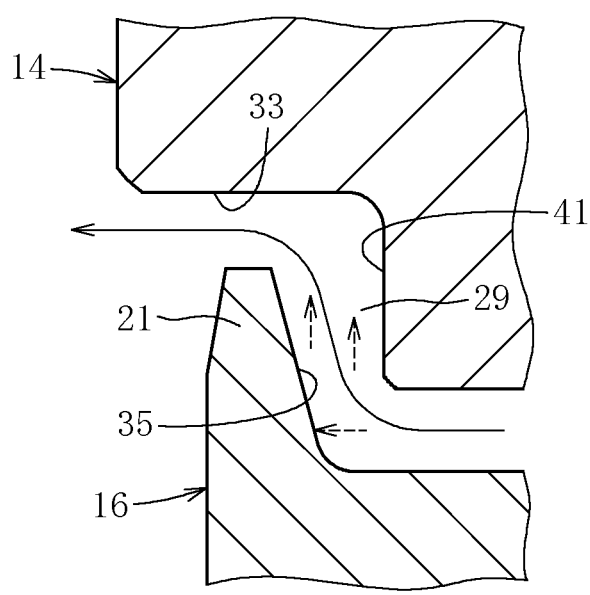
FIG. 9 is an enlarged cross-sectional view of a main part of the rolling bearing indicated by the circle "E" of FIG. 2.

In addition, in the labyrinth 29 (see FIG. 2) formed by the recessed groove 33 of the outer race 14 and the flange portion 21 positioned on the radially outer side of the retainer 16, as illustrated in FIG. 9, when the lubricant is caused to flow radially outward by the centrifugal force generated under high-speed rotation, the inner side surface 35 of the flange portion 21 is inclined so as to expand the labyrinth radially outward, and the axial end surface 41 of the recessed groove 33 of the outer race 14 is formed in the direction orthogonal to the axial direction. Accordingly, an interval between the inner side surface 35 of the flange portion 21 and the axial end surface 41 of the recessed groove 33 of the outer race 14 becomes wider radially outward, and hence the lubricant hits against the inner side surface 35 of the flange portion 21, to thereby flow along the inner side surface 35 radially outward (see the dashed arrows of FIG. 9). As a whole, the lubricant flows as indicated by the solid arrow of FIG. 9.

According to the embodiments described above (see FIGS. 1 and 2), the present invention has the following structure. Specifically, the flange portions 20 to 23 extending radially are formed on the radially inner side and the radially outer side of the axial end portions of the retainer 16. In the regions of the inner race 12 and the regions of the outer race 14 corresponding to the flange portions 20 to 23, the recessed grooves 30 to 33 are formed so as to define the labyrinths 24 to 29 together with the flange portions 20 to 23. The inner side surfaces 34 to 37 of the flange portions 20 to 23 or the axial end surfaces 38 to 41 of the recessed grooves 30 to 33, which are opposed to the inner side surfaces 34 to 37 of the flange portions, are inclined radially.

With this structure, the labyrinths 24 to 29 formed by the flange portions 20 to 23 and the recessed grooves 30 to 33 control the flow of the lubricant by inclined surfaces formed of the inner side surfaces 34 to 37 of the flange portions 20 to 23 or the axial end surfaces 38 to 41 of the recessed grooves 30 to 33. With this simple structure, the lubricant flows inside the retainer 16 in such a direction (radial direction) that the lubricant flows into the bearing from the radially inner side of the retainer 16 and flows out of the bearing to the radially outer side of the retainer or in such a direction (axial direction) that the lubricant flows into the bearing from one axial end side of the retainer 16 and flows out of the bearing to another axial end side of the retainer 16. Thus, the proper amount of the lubricant (cooled lubricant) can be supplied from the outside of the bearing into the inside of the bearing, and the lubricant having a high temperature can be discharged from the inside of the bearing to the outside of the bearing together with unnecessary foreign matters entering the inside of the bearing. In this way, it is possible to prevent foreign matters or an excessive amount of the lubricant from flowing from the outside of the bearing into the inside of the bearing, and to promptly discharge foreign matters contained in the lubricant having a high temperature.

In this embodiment, as illustrated in FIG. 1, the flange portions 20 to 23 each have an axial thickness t of 0.15 mm or more, and the axial thickness t is set to 20% or less of a diameter D of each rolling element 15. Thus, when the axial thickness t of each of the flange portions 20 to 23 is limited within the above-mentioned range, strength of each of the flange portions 20 to 23 can be ensured, and forming of each of the flange portions 20 to 23 is facilitated. As a result, an axial dimension of the bearing is not increased. Note that, when the axial thickness t of each of the flange portions 20 to 23 is smaller than 0.15 mm, poor strength of each of the flange portions 20 to 23 and poor forming thereof are more likely to be caused. Further, when the axial thickness t of each of the flange portions 20 to 23 is larger than 20% of the diameter D of each rolling element 15, it is necessary to increase an axial dimension (groove width) of each of the recessed grooves 30 to 33 of the inner race 12 and the outer race 14 in order to prevent the flange portions 20 to 23 of the retainer 16 from protruding from an end surface of the bearing. As a result, the axial dimension of each of the inner race 12 and the outer race 14 are increased, and hence the entire bearing is increased in size.

Further, in the above-mentioned embodiment, description is made of the case where the flange portions 20 to 23 are formed on each of the radially inner side and the radially outer side of the axial end portion of the retainer 16, but the present invention is not limited thereto. Although not shown, the flange portions 20 to 23 may be formed on only any one of the radially inner side and the radially outer side of the axial end portion of the retainer 16.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

The invention claimed is:

1. A rolling bearing comprising:
an inner race and an outer race rotatable relative to each other;
a plurality of rolling elements interposed between the inner race and the outer race;
a retainer arranged between the inner race and the outer race, for retaining the plurality of rolling elements equiangularly;
a flange portion formed on at least one of a radially inner side and a radially outer side of an axial end portion of the retainer so as to extend radially; and
a recessed groove formed in a region of the inner race corresponding to the flange portion or a region of the outer race corresponding to the flange portion so as to form a labyrinth together with the flange portion,
wherein at least one of an inner side surface of the flange portion and an axial end surface of the recessed groove, which is opposed to the inner side surface of the flange portion, is inclined radially so as to generate a flow of lubricant, and
wherein through the labyrinth formed by the flange portion and the recessed groove, the lubricant flowing from an outside of the rolling bearing into an inside of the rolling bearing and flowing out of the inside of the rolling bearing to the outside of the rolling bearing flows in such a direction that the lubricant flows into the rolling bearing from the radially inner side of the retainer and flows out of the rolling bearing to the radially outer side of the retainer.

2. The rolling bearing according to claim 1,
wherein the inner side surface of the flange portion positioned on the radially inner side of each axial end portion of the retainer is inclined so as to expand the labyrinth radially inward, and
wherein the axial end surface of the recessed groove positioned at each axial end portion of the outer race is inclined so as to expand the labyrinth radially inward.

3. The rolling bearing according to claim 1
wherein the flange portion has an axial thickness of 0.15 mm or more, and
wherein the axial thickness is set to 20% or less of a diameter of each of the plurality of rolling elements.

4. The rolling bearing according to claim 1,
wherein the retainer comprises two annular members that face each other in an axial direction of the rolling bearing and have opposing surfaces each comprising hemispherical pockets formed in a plurality of circumferential positions and configured to receive the plurality of rolling elements, and
wherein the two annular members are coupled together so that the opposing surfaces are brought into abutment on each other.

5. The rolling bearing according to claim 1, wherein the retainer is made of a synthetic resin.

6. The rolling bearing according to claim 1, wherein the retainer is made of any one synthetic resin selected from among PPS, PA66, and PA46.

7. A rolling bearing comprising:
an inner race and an outer race rotatable relative to each other;
a plurality of rolling elements interposed between the inner race and the outer race;
a retainer arranged between the inner race and the outer race, for retaining the plurality of rolling elements equiangularly;
a flange portion formed on at least one of a radially inner side and a radially outer side of an axial end portion of the retainer so as to extend radially; and
a recessed groove formed in a region of the inner race corresponding to the flange portion or a region of the outer race corresponding to the flange portion so as to form a labyrinth together with the flange portion,
wherein at least one of an inner side surface of the flange portion and an axial end surface of the recessed groove, which is opposed to the inner side surface of the flange portion, is inclined radially so as to generate a flow of lubricant, and
wherein through the labyrinth formed by the flange portion and the recessed groove, the lubricant flowing from an outside of the rolling bearing into an inside of the rolling bearing and flowing out of the inside of the rolling bearing to the outside of the rolling bearing flows in such a direction that the lubricant flows into the bearing from one axial end side of the retainer and flows out of the bearing to another axial end side of the retainer.

8. The rolling bearing according to claim 7,
wherein the inner side surface of the flange portion positioned on the radially inner side of one axial end portion of the retainer is inclined so as to expand the labyrinth radially inward, wherein the inner side surface of the flange portion positioned on the radially outer side of the one axial end portion of the retainer is inclined so as to expand the labyrinth radially inward, wherein the inner side surface of the flange portion positioned on the radially outer side of another axial end portion of the retainer is inclined so as to expand the labyrinth radially outward, and wherein the axial end surface of the recessed groove positioned at an axial end portion of the outer race is formed in a direction orthogonal to an axial direction of the rolling bearing.

9. The rolling bearing according to claim 7, wherein the flange portion has an axial thickness of 0.15 mm or more, and wherein the axial thickness is set to 20% or less of a diameter of each of the plurality of rolling elements.

10. The rolling bearing according to claim 7, wherein the retainer comprises two annular members that face each other in an axial direction of the rolling bearing and have opposing surfaces each comprising hemispherical pockets formed in a plurality of circumferential positions and configured to receive the plurality of rolling elements, and wherein the two annular members are coupled together so that the opposing surfaces are brought into abutment on each other.

11. The rolling bearing according to claim 7, wherein the retainer is made of a synthetic resin.

12. The rolling bearing according to claim 7, wherein the retainer is made of any one synthetic resin selected from among PPS, PA66, and PA46.

13. A rolling bearing comprising:

an inner race and an outer race rotatable relative to each other;

a plurality of rolling elements interposed between the inner race and the outer race;

a retainer arranged between the inner race and the outer race, for retaining the plurality of rolling elements equiangularly;

a flange portion formed on at least one of a radially inner side and a radially outer side of an axial end portion of the retainer so as to extend radially; and a recessed groove formed in a region of the inner race corresponding to the flange portion or a region of the outer race corresponding to the flange portion so as to form a labyrinth together with the flange portion, wherein at least one of an inner side surface of the flange portion and an axial end surface of the recessed groove, which is opposed to the inner side surface of the flange portion, is inclined radially so as to generate a flow of lubricant, wherein the retainer has structure in which two annular members having asymmetrical shapes are coupled together, and wherein the two annular members are colored differently.

14. The rolling bearing according to claim 13, wherein the flange portion has an axial thickness of 0.15 mm or more, and wherein the axial thickness is set to 20% or less of a diameter of each of the plurality of rolling elements.

15. The rolling bearing according to claim 13, wherein the retainer comprises two annular members that face each other in an axial direction of the rolling bearing and have opposing surfaces each comprising hemispherical pockets formed in a plurality of circumferential positions and configured to receive the plurality of rolling elements, and wherein the two annular members are coupled together so that the opposing surfaces are brought into abutment on each other.

16. The rolling bearing according to claim 13, wherein the retainer is made of a synthetic resin.

17. The rolling bearing according to claim 13, wherein the retainer is made of any one synthetic resin selected from among PPS, PA66, and PA46.

* * * * *